US009838846B1

(12) United States Patent
Le Grand

(10) Patent No.: US 9,838,846 B1
(45) Date of Patent: Dec. 5, 2017

(54) EXTRACTION OF WALKING DIRECTION FROM DEVICE ORIENTATION AND RECONSTRUCTION OF DEVICE ORIENTATION DURING OPTIMIZATION OF WALKING DIRECTION

(71) Applicant: Google Inc., Mountain View, CA (US)

(72) Inventor: Etienne Le Grand, Mountain View, CA (US)

(73) Assignee: Google LLC, Mountain View, CA (US)

( * ) Notice: Subject to any disclaimer, the term of this patent is extended or adjusted under 35 U.S.C. 154(b) by 144 days.

(21) Appl. No.: 14/815,500

(22) Filed: Jul. 31, 2015

Related U.S. Application Data

(60) Provisional application No. 62/032,522, filed on Aug. 1, 2014.

(51) Int. Cl.
   *H04W 24/00* (2009.01)
   *H04W 4/02* (2009.01)
   *G01C 21/12* (2006.01)

(52) U.S. Cl.
   CPC ............ *H04W 4/026* (2013.01); *G01C 21/12* (2013.01)

(58) Field of Classification Search
   CPC .............................. H04W 4/026; H04W 4/027
   USPC ............................................ 455/456.1–456.6
   See application file for complete search history.

(56) References Cited

U.S. PATENT DOCUMENTS

| | | |
|---|---|---|
| 6,947,734 B1 | 9/2005 | Toubassi |
| 7,844,415 B1 * | 11/2010 | Bryant ................. G01C 17/02 702/141 |
| 8,509,761 B2 | 8/2013 | Krinsky et al. |
| 8,521,429 B2 | 8/2013 | Sundararajan et al. |
| 9,357,520 B2 | 5/2016 | Le Grand et al. |

(Continued)

FOREIGN PATENT DOCUMENTS

| | | |
|---|---|---|
| WO | WO9522041 | 8/1995 |
| WO | WO2012106075 | 8/2012 |

(Continued)

OTHER PUBLICATIONS

Chen, et al., "Outlier-Detection-Based Indoor Localization System for Wireless Sensor Networks", http://www.hindawi.com/journals/ijno/2012/961785 (2012).

*Primary Examiner* — Joshua Schwartz
(74) *Attorney, Agent, or Firm* — McDonnell Boehnen Hulbert & Berghoff LLP

(57) ABSTRACT

A method implemented by one or more processors may include determining a rotation between a client device frame and a world frame, determining a rotation between an average gravity aligned (AGA) frame of the client device and the client device frame, performing step detection of the client device, and determining a change in orientation from a first detected step to a second detected step. In one example, computing the change in orientation includes determining a rotation between a horizontally projected AGA (HPAGA) frame and the AGA frame, determining a rotation between the world frame and the HPAGA frame, and determining the change in orientation by using the rotation between the world frame and the HPAGA frame. The method may also include determining, using the computed change in orientation, pedestrian dead reckoning data of the client device over a time period, and determining an output location estimate of the client device using the pedestrian dead reckoning data.

20 Claims, 9 Drawing Sheets

(56) References Cited

U.S. PATENT DOCUMENTS

| | | |
|---|---|---|
| 2004/0127252 A1 | 7/2004 | Tsunomoto |
| 2006/0095349 A1 | 5/2006 | Morgan |
| 2008/0033645 A1 | 2/2008 | Levinson et al. |
| 2011/0028122 A1 | 2/2011 | Kota et al. |
| 2011/0250926 A1 | 10/2011 | Wietfeldt |
| 2013/0138246 A1 | 5/2013 | Gutmann et al. |
| 2013/0225202 A1 | 8/2013 | Shim et al. |
| 2013/0257657 A1 | 10/2013 | Garin |
| 2013/0317944 A1 | 11/2013 | Huang et al. |
| 2014/0031980 A1 | 1/2014 | Gutmann et al. |
| 2014/0372072 A1* | 12/2014 | Guo .................... H04B 10/116 702/150 |
| 2015/0223189 A1 | 8/2015 | Le Grand et al. |
| 2015/0226577 A1 | 8/2015 | Le Grand et al. |
| 2015/0308839 A1* | 10/2015 | Jiang .................... G01S 19/12 702/5 |
| 2016/0025498 A1 | 1/2016 | Le Grand |
| 2016/0033265 A1 | 2/2016 | Le Grand et al. |

FOREIGN PATENT DOCUMENTS

| | | |
|---|---|---|
| WO | WO2013037034 | 3/2013 |
| WO | WO2013071190 | 5/2013 |

* cited by examiner

EXTRACTION OF WALKING DIRECTION FROM DEVICE ORIENTATION AND RECONSTRUCTION OF DEVICE ORIENTATION DURING OPTIMIZATION OF WALKING DIRECTION

CROSS REFERENCE TO RELATED PATENT APPLICATION

The present application claims priority to U.S. provisional patent application No. 62/032,522 filed on Aug. 1, 2014, the entire contents of which are herein incorporated by reference.

BACKGROUND

Unless otherwise indicated herein, the materials described in this section are not prior art to the claims in this application and are not admitted to be prior art by inclusion in this section.

A location of a computing device can be determined using different techniques, such as techniques based on Global Positioning System (GPS) data or on data associated with a wireless access point (e.g., a cellular base station or an 802.11 access point). In one example, a computing device may receive a GPS signal and responsively determine its position on the face of the Earth (e.g. an absolute location). In another example, a computing device may receive a signal from either a cellular base station or an 802.11 access point. The cellular base station or an 802.11 access point may estimate an exact location. Based on the location of either the cellular base station or an 802.11 access point, the computing device can calculate its position.

Within some instances, a localization of a computing device may occur via use of data from multiple different networks. Many location-based services can be provided to a computing device based on determining the location of the mobile computing device.

SUMMARY

In one example, a method performed, at least in part, by one or more processors of a computing device, includes determining a rotation between a client device frame and a world frame, determining a rotation between an average gravity aligned (AGA) frame of the client device and the client device frame, performing step detection of the client device, and determining a change in orientation from a first detected step to a second detected step. In this example, computing the change in orientation further includes determining a rotation between a horizontally projected AGA (HPAGA) frame and the AGA frame, and determining a rotation between the world frame and the HPAGA frame. Determining the rotation between the world frame and the HPAGA frame may use one or more of the rotation between the client device frame and the world frame, the rotation between the AGA frame and the client device frame, or the rotation between the HPAGA frame and the AGA frame. Computing the change in orientation may also include determining the change in orientation by using the rotation between the world frame and the HPAGA frame. The example method may also include determining, using the computed change in orientation, pedestrian dead reckoning data of the client device over a time period, and determining an output location estimate of the client device using the pedestrian dead reckoning data.

Another example is directed to a non-transitory computer-readable medium having stored therein instructions, that when executed by one or more processors of a computing device, cause the computing device to perform various functions. In one example, the functions include determining a rotation between a client device frame and a world frame, determining a rotation between an average gravity aligned (AGA) frame of the client device and the client device frame, performing step detection of the client device, and determining a change in orientation from a first detected step to a second detected step. In this example, computing the change in orientation further includes determining a rotation between a horizontally projected AGA (HPAGA) frame and the AGA frame, and determining a rotation between the world frame and the HPAGA frame. Determining the rotation between the world frame and the HPAGA frame may use one or more of the rotation between the client device frame and the world frame, the rotation between the AGA frame and the client device frame, or the rotation between the HPAGA frame and the AGA frame. Computing the change in orientation may also include determining the change in orientation by using the rotation between the world frame and the HPAGA frame. The example method may also include determining, using the computed change in orientation, pedestrian dead reckoning data of the client device over a time period, and determining an output location estimate of the client device using the pedestrian dead reckoning data.

A further example provides a system that includes a processor and a computer-readable medium. The computer-readable medium is configured to store instructions, that when executed by the at least one processor, cause the system to perform functions. In one example, the functions include determining a rotation between a client device frame and a world frame, determining a rotation between an average gravity aligned (AGA) frame of the client device and the client device frame, performing step detection of the client device, and determining a change in orientation from a first detected step to a second detected step. In this example, computing the change in orientation further includes determining a rotation between a horizontally projected AGA (HPAGA) frame and the AGA frame, and determining a rotation between the world frame and the HPAGA frame. Determining the rotation between the world frame and the HPAGA frame may use one or more of the rotation between the client device frame and the world frame, the rotation between the AGA frame and the client device frame, or the rotation between the HPAGA frame and the AGA frame. Computing the change in orientation may also include determining the change in orientation by using the rotation between the world frame and the HPAGA frame. The example method may also include determining, using the computed change in orientation, pedestrian dead reckoning data of the client device over a time period, and determining an output location estimate of the client device using the pedestrian dead reckoning data.

These as well as other aspects, advantages, and alternatives, will become apparent to those of ordinary skill in the art by reading the following detailed description, with reference where appropriate to the accompanying figures.

DETAILED DESCRIPTION

Figure 1:
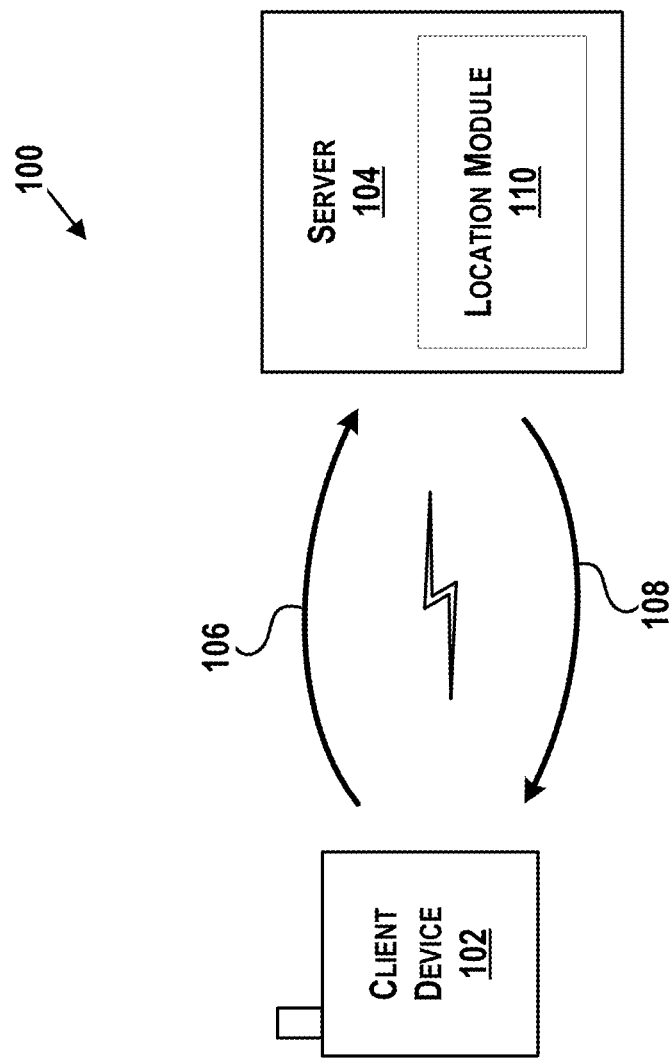
FIG. 1 illustrates a block diagram of an example communication system according to an embodiment of the present disclosure.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. Overview

Within examples, a number of logs of data or traces of data are received from one or more devices. The data may include a variety of information collected by one or more sensors of the devices. These sensors may include a GPS, accelerometer, gyroscope, inertial measurement unit (IMU), barometer, magnetometer, and WIFI signal strength sensor, as just some examples. The present disclosure relates to techniques for processing orientation data in the traces of data, such as from an accelerometer, gyroscope, and/or magnetometer, to determine an orientation of the device and/or a user of the device. The device and/or user orientation may be determined with respect to a frame of reference relative to the earth or a world frame.

The present disclosure also relates to using the device/user orientation to determine a walking direction or pedestrian dead reckoning associated with the device. In one aspect, a computing device, such as a cellular phone, may use pedestrian dead reckoning calculations to localize a position of the device and to build a map of a location of the device and of a user of the device. Generally, dead reckoning calculations link positions of devices between two steps. For instance, a first step may be at time t, and a second step may be at t+1. The second step is on average likely to be around 3 ft in front of the first step, and an angle of turn or change in orientation between the first and second steps can be determined using, for example, gyroscope data.

An example dead reckoning determination may be performed to determine an estimation of a current position of the computing device based on a previous position of the computing device, an estimated speed over an elapsed time, and an orientation or direction of travel of the computing device. Within examples, information indicating a previous position may be received from a server that calculates or determines the information due to communication with a computing device, or from sensors of the computing device including a GPS sensor. The previous position may also be derived or calculated from a number of data points such as GPS location determinations, or WIFI scans and associated WIFI mappings. The estimated speed can also be received from a server, or derived or calculated from position determinations over an elapsed time or based on other data over the elapsed time including outputs of a pedometer, for example. Using a known or estimated distance traveled (as derived or calculated from outputs of a pedometer, derived from outputs of an accelerometer inferring a step has been taken, or from other sensor data), a speed can be determined based on the elapsed time. The orientation or direction of travel of the computing device may be determined from data received from a server, or from sensors on-board the computing device such as a magnetometer or compass, for example. Any available information may be used to infer an orientation or a direction of travel including a fusion of accelerometer, gyroscope, and optionally magnetometer data, for example. In still other examples, other available information can be used to provide further estimates (directly or indirectly) as to direction of travel, including WIFI scans received in traces that may give information as to a position and heading of a device and/or user.

The dead reckoning calculation can be performed to determine an estimation of the current position of the computing device. As an example, an accelerometer of the computing device can be used as a pedometer and a gyroscope or magnetometer as an orientation or compass heading provider. Each step of a user of the computing device causes a position to move forward a fixed distance in an orientation direction measured by the compass. Accuracy may be limited by precision of the sensors, magnetic disturbances inside structures of the computing device, and unknown variables such as carrying position of the computing device and stride length of the user. However, the estimate of the current position can be determined in this manner. The present disclosure provides additional techniques for determining orientation data.

Further, the present disclosure relates to fusing or linking the dead reckoning calculations with other constraints, such as Wi-Fi scan data, GPS readings, and/or magnetic field data, to determine and refine a map and position of a device and/or user of the device. Generally, a computing device, such as a mobile phone or a server device, can perform fusion or linking of various constraints, such as dead reckoning calculations and magnetic field information in a tight-coupling manner or loose-coupling manner. Tight-coupling calculations may provide relatively high accuracy, but may also be relatively computationally-intensive, and may be prone to convergence to an incorrect solution. Loose-coupling calculations are generally less computationally-intensive than tight-coupling calculations, and may be more robust but may provide lower accuracy than tight-coupling calculations. In examples disclosed herein, the present disclosure adapts loose-coupling calculations to estimate the orientation of the device and/or the user of the device with respect to the world frame.

The device orientation may also be used to rotate or otherwise process magnetic field information according to a frame of reference of the device with respect to the world. The computing device may use the processed magnetic field information, and perhaps with other constraints, to determine a location of the device and/or to build a map of an area around the device.

Further, the computing device may present a map on a display, and show the device location on the map, or otherwise generate information and instructions for providing such a display. The location of the device may also be used in location-based services, such as to narrow an Internet search to an area that is nearby the client device location, to personalize "local" news and/or weather updates or information sent to the device, to direct emergency calls (e.g., 911 call-services) to an appropriate or closest call handling service, and the like.

II. Example Systems and Devices

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, a tablet computing device, and the like, that is configured to transmit data 106 to and/or receive data 108 from the server 104 in accordance with the method and functions described herein. The client device 102 may include a user interface, a communication interface, a processor, and data storage comprising instructions executable by the processor for carrying out one or more functions relating to the data sent to, and/or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to and/or receive data 106 from the client device 102. The server 104 may include a location module 110 which may be configured to process the data 106 received from the client device 102 to determine locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location, updated location history information, or information based on the locations of the device.

Figure 2:
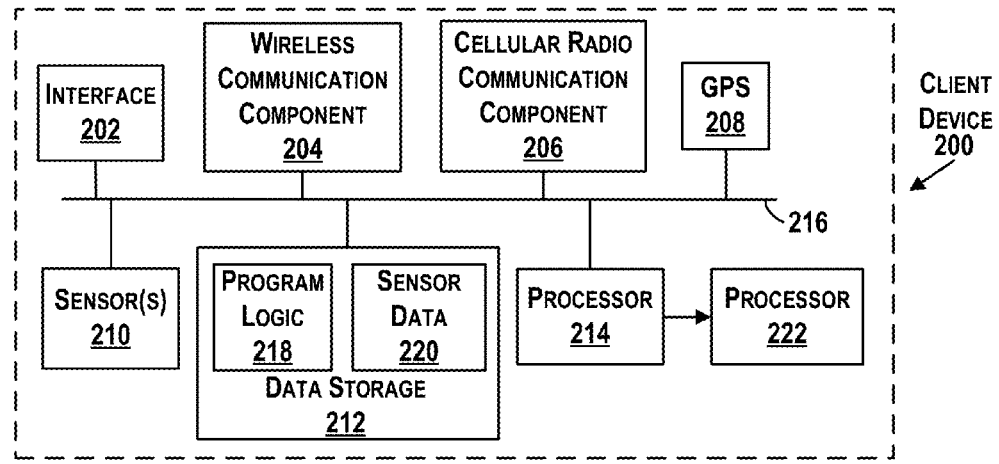
FIG. 2 illustrates a block diagram of an example computing device according to an embodiment of the present disclosure.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, one or more sensors 210, data storage 212, and a processor 214. Components illustrated in FIG. 2 may be linked or coupled together by a communication link or bus 216. The client device 200 may also include hardware to enable communication within the client device 200 and between the client device 200 and another computing device, such as the server 104 of FIG. 1. The hardware may include transmitters, receivers, and antennas, for example.

In one example, the interface 202 is configured to allow the client device 200 to communicate with another computing device, such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a WIFI communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, and/or the GPS 208. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In other examples, the processor 214 may use a location-determination algorithm to determine a location of the client device 200 based Bluetooth wireless signals. The Bluetooth signals can be compared to a map of Bluetooth devices, and a measurement probability map in which a given Bluetooth wireless signal is estimated to be received can be determined. Within examples, Bluetooth devices may include static devices (e.g., such as Bluetooth Low Energy (BLE) beacons) that emit signals to nearby devices. Each Bluetooth device will have a range in which signals can be emitted, and the range can be used as a measurement probability map as the constraint for locations of the device.

In still other examples, the processor 214 may use a location-determination algorithm to determine a location of the client device 200 based on magnetic field signals. For example, ambient magnetic fields are present in environments, and include disturbances or anomalies in the Earth's magnetic field caused by pillars, doors, elevators in hallways, or other objects that may be ferromagnetic in nature. A device may measure a magnetic field, and when such magnetic field measurements are present in the logs of data, the measurements can be compared to a map of magnetic field signal strength for a given location, and a measurement probability map in which a given magnetic field signal strength corresponds to a signal strength of the magnetic field signal can be determined and used as the constraint to determine a location of the client device.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, magnetometer, pedometer, barometer, light sensors, microphone, camera, or other location and/or context-aware sensors.

The processor 214 may also use a location-determination algorithm that fuses data from the one or more sensors 210. For instance, the processor 214 may be configured to execute a dead reckoning algorithm that uses a log of sensor data as inputs to the dead reckoning algorithm to determine an estimated trajectory or pedestrian dead reckoning of the client device and associated user.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The illustrated client device 200 in FIG. 2 includes an additional processor 222. The processor 222 may be configured to control other aspects of the client device 200 including displays or outputs of the client device 200 (e.g., the processor 222 may be a GPU). Example methods described herein may be performed individually by components of the client device 200, or in combination by one or more of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
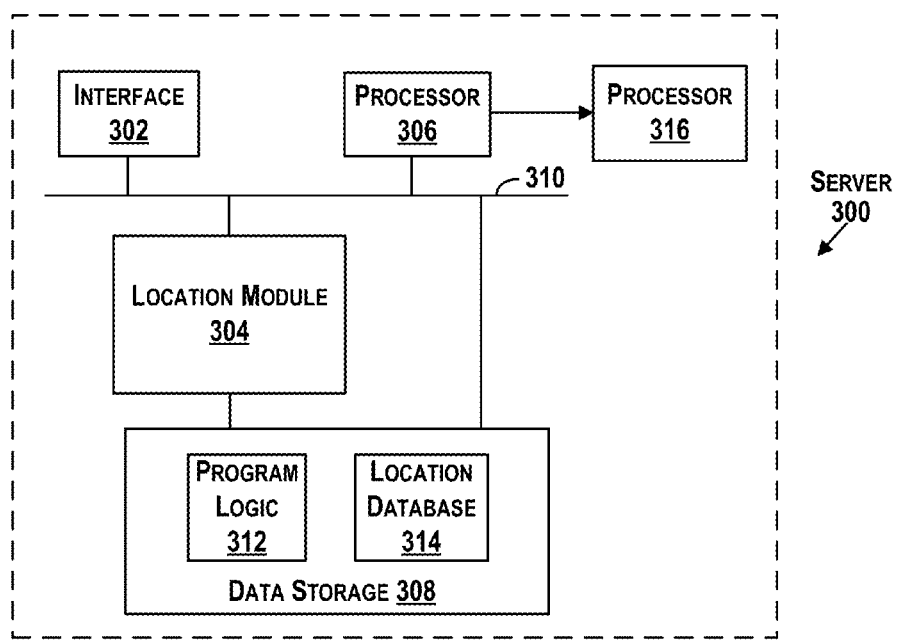
FIG. 3 illustrates a block diagram of an example computing device according to another embodiment of the present disclosure.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked or coupled together by a communication link or bus 310 (e.g., a wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of an accelerometer, gyroscope, barometer, magnetometer, or other sensors of the client device, as well as based on location determinations of the client device.

Further, the location module 304 may be configured to execute a dead reckoning algorithm. Using a log of sensor data as inputs to the dead reckoning algorithm, the location module 304 may determine an estimated trajectory or pedestrian dead reckoning of the client device and associated user.

The location module 304 may also be configured to determine and store a history of sensor measurements of the client device for later reprocessing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, magnetic field data, orientation data, locations of satellites in a GPS network, floor plans of a building, etc., or any other type of information useful for determining a location of a client device.

The server is illustrated with a second processor 316, which may be an application specific processor for input/output functionality. In other examples, functions of the processor 306 and the processor 316 may be combined into one component.

Within examples, measurements collected from various sensors of a device (such as WIFI components, GPS sensors, barometers, and inertial sensors) can be combined with information from external databases (such as known locations of WIFI access points or building floor plans) to estimate a location or movement of the device in real-time. Recording the real-time location estimate at all times (or intervals/increments of time) may also produce a location history.

III. Example Methods and Functionality

Figure 4:
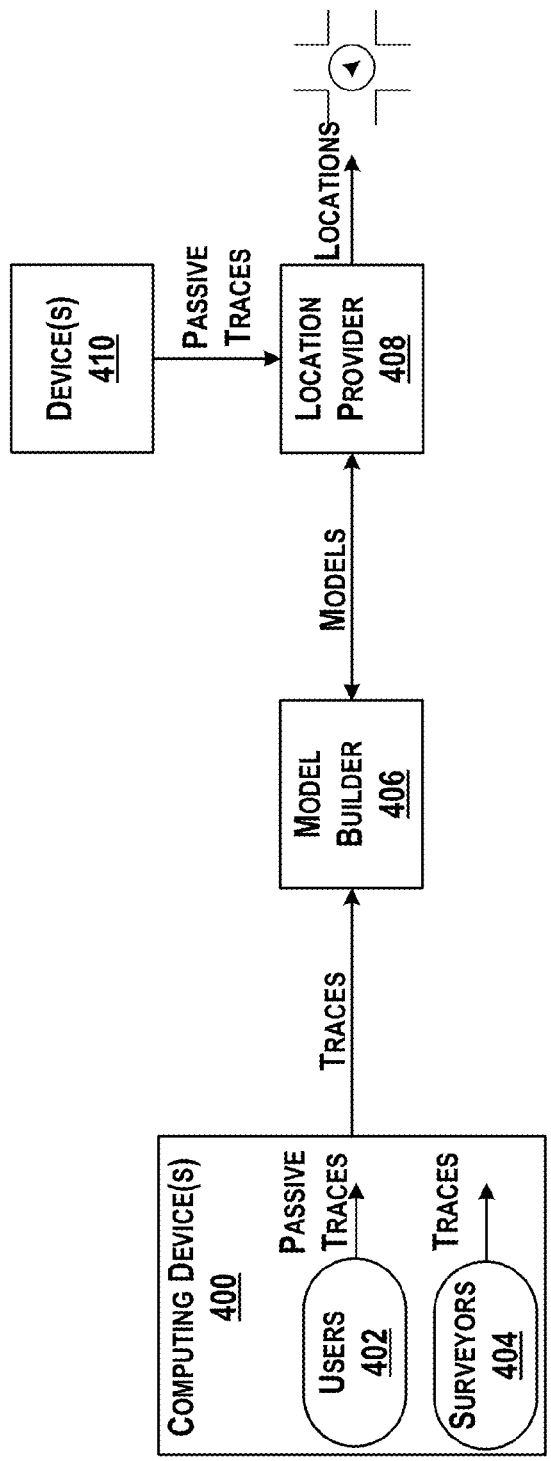
FIG. 4 is a flow chart of an example method for determining a location and/or movement of a device.

FIG. 4 is a flow diagram illustrating an example method for determining a location or movement of a device. Initially, computing device(s) 400, operated by users 402 or surveyors 404, may traverse areas in an environment and output traces to a model builder 406. A device operated by a user 402 may output traces passively (e.g., the device may be configured to output the trace data with no additional user input), including raw data output by sensors of the device like WIFI scans, GPS data, accelerometer data, gyroscope data, barometer readings, magnetometer data, etc. Each trace may be associated with a time the data was collected, and thus, for traces that include GPS data, other data in the traces also has location-specific references. A device operated by a surveyor 404 may have location-specific references for all traces, whether due to associated GPS data or manual input of location information.

The model builder 406 may be a module on a computing device or server, and may be configured to generate a model of the environment based on the received traces. The model builder 406 may include a trace localizer and a map builder. The model builder 406 may access reference data or information, such as magnetic field signal strength data in the environment at specific locations in the environment, or other landmark data of the environment, such as strength of signal (RSSI) for WIFI access points. The model builder 406 may be configured to generate a map or path of the device based on the traces. In one example, the model builder 406 may utilize GPS data to determine locations of the device over time, utilize dead reckoning (based on accelerometer and gyroscope outputs) to project a path, utilize elevational data (such as based on GPS elevational data and barometer readings), and optimize the path by jointly combining each. The model builder 406 may further optimize the path to match magnetic field data to reference magnetic field maps to align a path that most likely resembles a path that the device traversed through the environment.

A location provider 408 may access a model output by the model builder 406 to determine locations of other device(s) 410 based on provided passive traces as well. Within examples, the location provider 408 may return a location of the device or an estimation of movement of the device to the device 410 based on data received in the traces. The computing device may use the determined locations to present a map on a display of the device, for example, and show a device location on the map, or otherwise generate information and instructions for providing such a display. The location of a device may also be used in location-based services, such as to narrow an Internet search to an area that is nearby the device location, to personalize "local" news and/or weather updates or information sent to the device, to direct emergency calls (e.g., 911 call-services) to an appropriate or closest call handling service, and the like.

Traces received from devices may include a variety of measurements from multiple different sensors, and may include a variety of measurements collected over time or at various locations. A trace may refer to a sensor log or a collection of data output from sensors on the device over some time period and collected over a number of locations. The sensors that output data may be selected, or data to be included within the sensor log may also be selected. In some examples, a trace of data may include all data collected by a device (using a number of sensors) over a given time frame (e.g., about 5 seconds, or perhaps about 5 minutes or any ranges therein or longer). Measurements in a trace or from trace to trace may be considered statistically independent. However, in instances in which the measurements are collected from positions/locations in close proximity or collected close in time, the measurements may have correlations.

The traces or logs of data may be used to build a magnetic field strength map of the number of locations aligned to latitude and longitude or position coordinates. Estimate magnetic field strengths can be made based on known locations of where the magnetic field scans occurred. The reverse is also true. To solve the problem when both are initially unknown, a simultaneous localization and mapping (SLAM) can be performed to solve both at the same time using received data in the logs of data. If one of a location of a magnetic field anomaly or locations of magnetic field scans are known, then the known data can be held constant while optimizing the other. The received logs of data can be used to determine relative paths traversed by the devices using dead reckoning, which provides estimates of AP locations and trajectory of the devices relative to each other, and such relative estimates can be aligned with more absolute positions using measurements from GPS. However, GPS generally provides accurate latitude and longitude measurements, but only in certain locations (mostly outdoors).

Additional or alternative maps of signals or signal strengths may also be generated based on received logs of data or accessed to localize a device. Such maps include WIFI strength of signal (RSSI) maps, Bluetooth device maps, or geographic walkway and street maps, for example.

Thus, within examples, trustworthy measurements in an absolute frame can be accessed first to generate a first estimate of a magnetic field strength map, and new measurements and new sensor logs can be introduced to refine the estimate using the estimate as a starting point to build upon. As each new piece of data is introduced, a current estimate is held constant and used to determine an initial estimate for the new data. Then, a SLAM optimization may be performed to jointly optimize all data without keeping anything constant. Iterations may be performed until all data has been considered.

Figure 5:
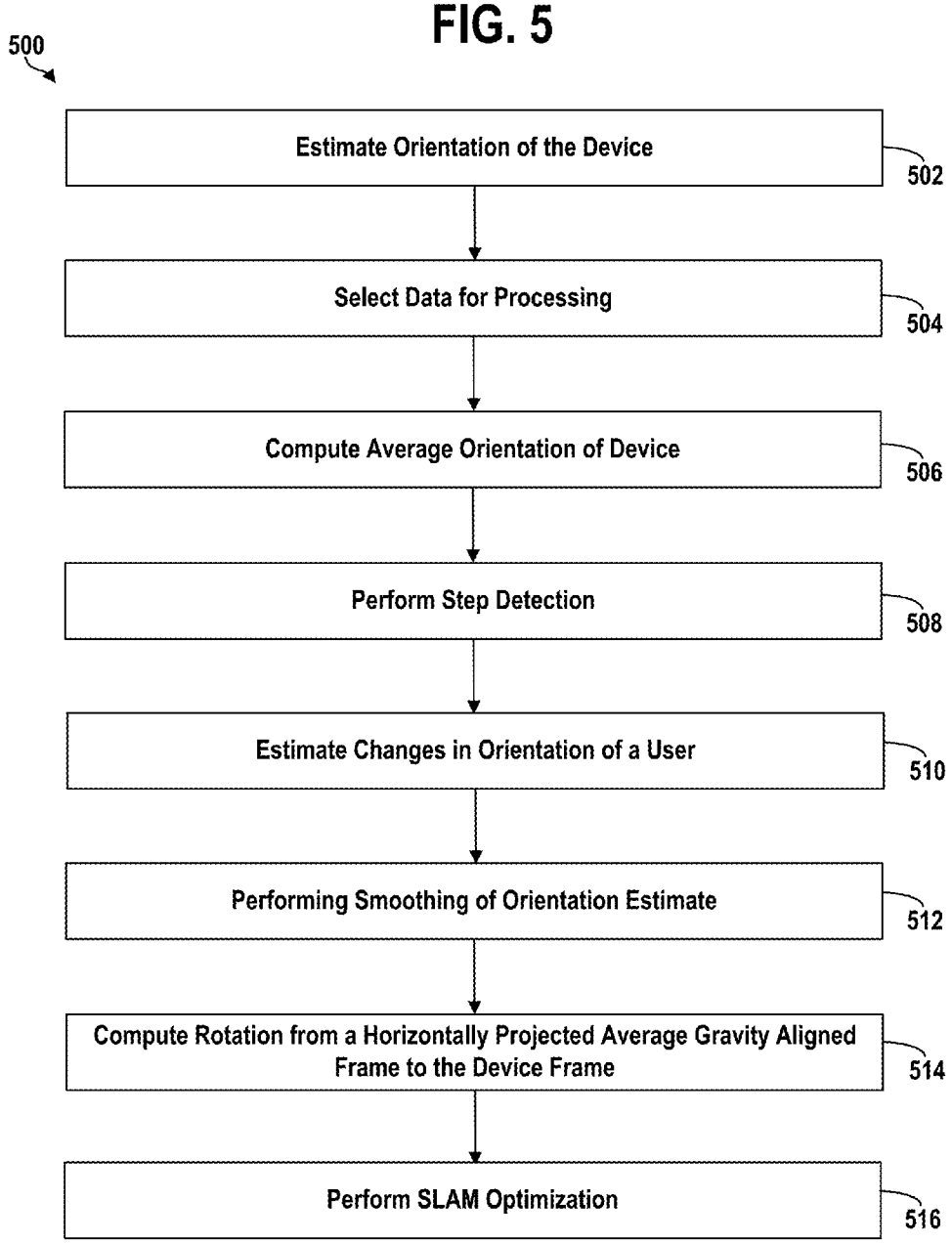
FIG. 5 is a flow chart of another example method for determining and using one or more orientations associated with a device.

FIG. 5 is a block diagram of an example method in accordance with at least some embodiments described herein. Method 500 shown in FIG. 5 presents an embodiment of a method that, for example, could be used with the system 100 in FIG. 1, the device 200 in FIG. 2, the server 300 in FIG. 3, and/or the method in FIG. 4, for example, or may be performed by a combination of any components or processes of FIGS. 1-4. Method 500 may include one or more operations, functions, or actions as illustrated by one or more of blocks 502-516. Although the blocks are illustrated in a sequential order, these blocks may in some instances be performed in parallel, and/or in a different order than those described herein. In addition, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5 may represent circuitry and/or other hardware that is wired or otherwise configured to perform the specific logical functions and processes of method 500.

Functions of the method 500 may be fully performed by a computing device (or components of a computing device such as one or more processors), or may be distributed across multiple computing devices and/or a server. In some examples, the computing device may receive information from sensors of the computing device, or where the computing device is a server the information can be received from another device that collects the information.

At block 502 of FIG. 5, a computing device, such as one or more of the client devices and/or servers discussed herein, estimates an orientation of a client device (e.g., a phone) by computing a rotation from a coordinate frame of a client device (e.g., device frame) to a coordinate frame of the earth (e.g., world frame). This rotation from the device frame to the world frame is identified as $R_{device}^{world}$.

Figure 6:
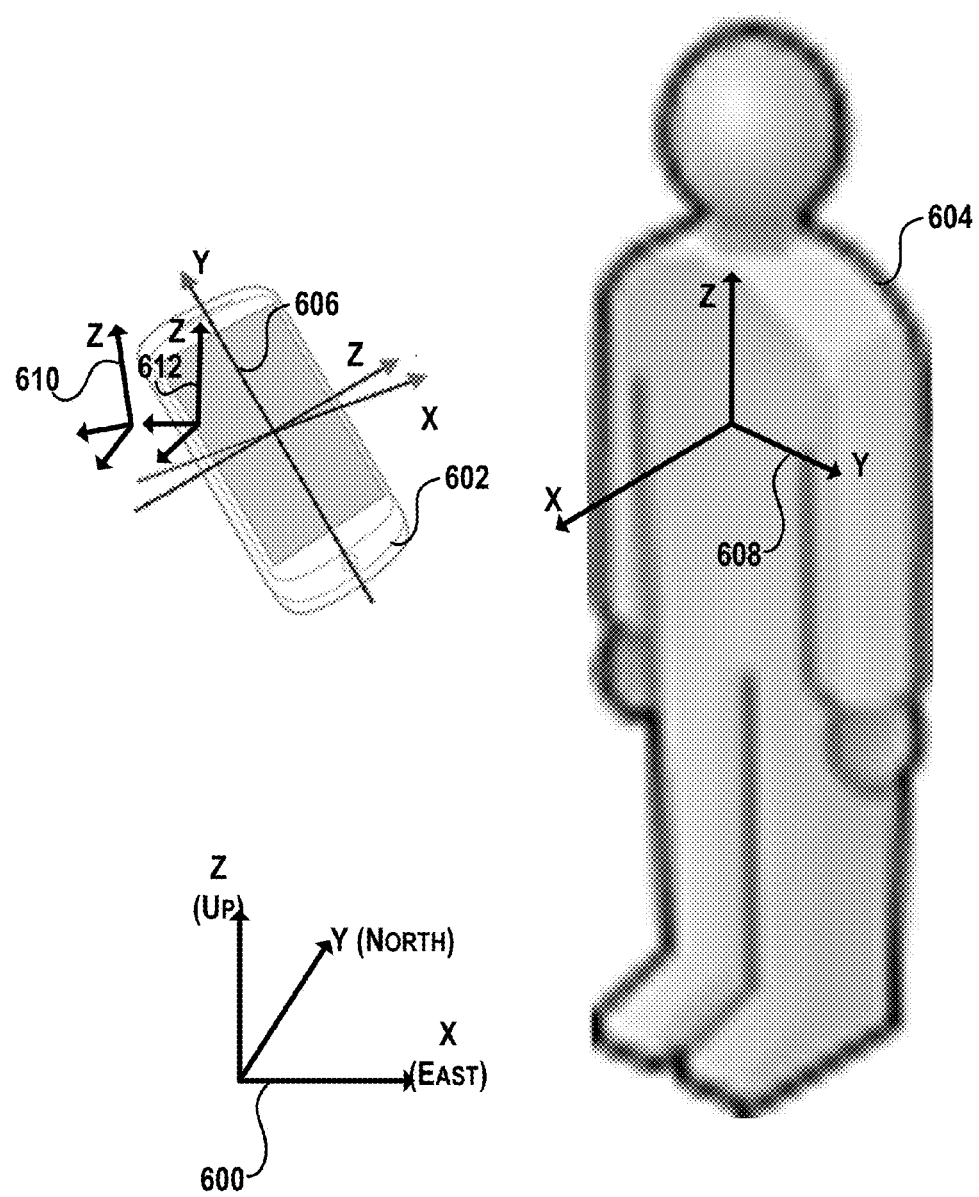
FIG. 6 illustrate different reference frames for determining one or more orientations associated with a device.

Referring to FIG. 6, for example, a world frame 600 may be defined by an XYZ-coordinate frame, with the positive X-axis extending east, the positive Y-axis extending north, and the positive Z-axis extending up (e.g., directed radially away from the center of the earth). Generally, the world frame 600 varies depending on the location of a client device 602 and an associated user 604 on the earth. However, the world frame 600 may be considered fixed over a relatively short period of time, such as one day, because the variation of the world frame 600 based on the user's steps is likely insignificant. In other examples, the world frame may be allowed to drift over time.

Further, FIG. 6 shows a device frame 606 that may be defined by an XYZ-coordinate frame, with the positive X-axis extending to the right with respect to a front face of the device 602, the positive Y-axis extending up with respect to the front face of the device, and the positive Z-axis extending perpendicularly out of the front face of the device. FIG. 6 also illustrates a user frame 608 that may be defined by an XYZ-coordinate frame, with the X-axis extending in front of and away from the user 604, the Y-axis extending to the left of the user, and the Z-axis extending up from the user.

At block 502, the computing device computes the rotation $R_{device}^{world}$ to relate the device frame 606 to the world frame 600. The computing device may estimate the rotation $R_{device}^{world}$ by fusing device sensor data. The device sensor data may be collected by the client device over a plurality of locations and over a time period, and may include accelerometer and gyroscope data, and in some cases, magnetometer data. The magnetometer data, for instance, may be used to compensate for a bias effect of the gyroscope. In one example, the computing device may estimate the rotation $R_{device}^{world}$ by performing an extended kalman filter (EKF) method using the device sensor data. Alternatively or in conjunction, the computing device may estimate the rotation $R_{device}^{world}$ using a game rotation vector defined by Android open source software.

At block 504, the computing device selects data, such as device sensor data related to the rotation $R_{device}^{world}$ or the rotation itself, for further processing in the present method 500. In one example, at block 504, the computing device selects time slices during which an average orientation of the device relative to the user does not change or changes within a predetermined range. In one example, the time slices are selected by processing the rotation $R_{device}^{world}$, and identifying when the orientation of "world_down" in the device frame does not change significantly between time slices, such as by less than about 35 degrees. At block 504, the computing device may eliminate potentially unreliable data associated with large variations in the orientation of the device, which may occur when a user takes their phone out of their pocket, for example. Consequently, the computing device at block 504 may then select more reliable orientation data for further processing.

At block 506, the computing device estimates an average orientation of the device relative to the user by computing a rotation from an average gravity aligned (AGA) frame to the device frame. This rotation from AGA frame to the device frame is identified as a rotation $R_{AGA}^{device}$. The computing device may use the orientation data selected at block 504 to compute the rotation $R_{AGA}^{device}$, which may help to verify an assumption that the device is in a generally static position relative to the user.

In one example, the computing device performs the calculation of block 506 by creating a coordinate average gravity aligned (AGA) frame that is fixed relative to the device coordinate frame, and then computing the rotation from the AGA frame to the device frame. Generally, the computing device defines the AGA frame such that the Z-axis, once averaged, aligns generally with the Z-axis of the world frame. In one example, the client device measures the average gravity, which correlates to the negative-Z-axis and provides information regarding the down direction (e.g., directed radially toward the center of the earth). The computing device may then rotate the measured average gravity 180 degrees to generally align the average gravity with the positive-Z-axis of the world frame. FIG. 6 illustrates an example AGA frame 610 that may be defined by an XYZ-coordinate frame, with the positive Z-axis extending upwardly similar to the Z-axis of the world frame 600. In practice, the Z-axis of the AGA frame does not align precisely with the Z-axis of the world frame, because the world frame is not fixed with respect to the device and the device moves with respect to the world frame. The X and Y-axes of the AGA frame are orthogonal to each other and to the Z-axis, but otherwise the X and Y-axes may be defined arbitrarily.

For instance, at block 506, the computing device may use the following Equation 1 to define the AGA frame:

$$\text{AGA\_z\_in\_device\_frame} = \text{normalize}(\text{average}(\text{measured\_acceleration\_in\_device\_frame})) \quad (1)$$

In Equation 1, an accelerometer of the client device may provide the measured_acceleration_in_device_frame data. In another example, at block 506, the computing device may use the following Equation 2 to define the AGA frame:

$$\text{AGA\_z\_in\_device\_frame} = \text{normalize}(\text{average}(\text{world\_z\_in\_device\_frame})) \quad (2)$$

In Equation 2, the computing device may determine the world_z_in_device_frame data from an estimate of the orientation of the device relative to the real world according to Equation 3:

$$R_{world}^{device} * (0,0,1) \quad (3)$$

In this example, an AGA_x vector is selected to be perpendicular to an AGA_z vector, but otherwise may be selected arbitrarily by picking two non-collinear vectors, computing their cross product with AGA_z, and picking the normalization of the largest result. At block 506, once the computing device defines the AGA frame, the computing device may then compute the rotation $R_{AGA}^{device}$ from the AGA frame to the device frame. In the present example, this rotation $R_{AGA}^{device}$ remains constant for each time slice selected at block 504.

At block 508, the computing device may perform step detection using conventional techniques to determine steps taken by a user associated with the client device. Generally, the computing device may perform the step detection based on accelerometer and gyroscope outputs that correspond to typical step motions.

At block 510, for one or more (or each) step detected at block 508, the computing device estimates changes in orientation of the user. In one example, at block 510, the computing device projects the AGA frame to a horizontal plane to provide a horizontally projected AGA (HPAGA) frame. An X-axis of the HPAGA frame may be used to represent the orientation of the user. The HPAGA frame corresponds to the AGA frame when the Z-axis of the AGA frame is aligned with the Z-axis of the world frame. FIG. 6 illustrates such an HPAGA frame 612.

Further, at block 510, the computing device determines a rotation from the HPAGA frame to the AGA frame. This rotation is identified as $R_{HPAGA}^{AGA}$. The computing device may compute $R_{HPAGA}^{AGA}$ as the shortest rotation that transforms the Z-axis of the world frame into the Z-axis of the AGA frame. This rotation may vary over time, as the AGA frame moves over time.

In one example, the computing device at block 510 also computes a rotation from the world frame to the HPAGA frame. This rotation may be identified as $R_{world}^{HPAGA}$, and may be computed by the chain rule, such as in Equation 4 using the AGA frame and the device frame:

$$R_{world}^{HPAGA} = R_{AGA}^{HPAGA} * R_{device}^{AGA} * R_{world}^{device} \quad (4)$$

The computing device may compute the rotations in Equation 4 once each of the respective rotations are determined.

The computing device may then use the rotation $R_{world}^{HPAGA}$ to determine the change in orientation of the user from one detected step to another. In one example, the computing device determines this change in orientation of the user, or delta_theta, by comparing a user_yaw value between different steps. The computing device may compute the user_yaw value according to Equation 5:

$$\text{user\_yaw} = a\tan 2(\text{HPAGA\_x\_in\_world\_frame}.x, \text{HPAGA\_x\_in\_world\_frame}.y) + N \quad (5)$$

Equation 5 includes a constant value N, because the orientation of the user with respect to the device is not known. The computing device determines delta_theta by comparing the user_yaw between different steps, at which time the constant values N cancel out. For instance, the computing device may determine delta_theta between a first step s1 and a second step s2 using Equation 6:

$$\text{delta\_theta} = \text{user\_yaw\_step}(s2) - \text{user\_yaw\_step}(s1) \quad (6)$$

At block 512, the computing device may smooth the orientation estimate determined at block 510 to remove oscillations in orientation due to the human body zigzagging when each step is taken. The computing device may perform this smoothing by window averaging the orientation (user_yaw) and/or orientation changes (delta_theta) with a window size of two steps, for example. This example window averaging modifies the orientation estimate for each step to be the average between a present step and a previous step.

In FIG. 5, at block 514, the computing device may compute the rotation from the device frame to the HPAGA frame. The computing device may perform this computation each time the orientation of the device is requested (such as when magnetometer measurements are generated). In one example, the computing device may use the chain rule of Equation 7 to determine $R_{device}^{HPAGA}$.

$$R_{device}^{HPAGA} = R_{world}^{HPAGA} * R_{device}^{world} \quad (7)$$

Generally, this rotation encapsulates small movements in the device's orientation that are not due to changes in the heading of the user.

At block 516, the computing device may then perform a loose coupling or SLAM optimization, using as measurements, one or more of: pedestrian dead reckoning that is computed using data related to steps and changes in orientation of the user (e.g., user_yaw or delta_theta values, which may be smoothed at block 512 or not), as computed herein; WIFI signals in conjunction with WIFI environment information (such as WIFI RSSI fingerprint maps, or where WIFI access points are located and the associated signal strength of the access points, or information measured by devices from other users in the area); Bluetooth low energy (BLE) or other radio-frequency signals, used similarly to Wi-Fi signals; and/or magnetic field measurements. At block 516, the computing device uses one or more of these measurements (and/or perhaps others) in a SLAM optimization to determine a position and location of the device and user. In one example, at block 516, the computing device also performs the optimization to help refine estimates of different rotations or parameters. In the case where a map of the environment is known, SLAM can be replaced by a localization-only algorithm.

At block 516 (or after block 516), the computing device may use the determined location to present a map on a display, and show a device location on the map, or otherwise generate information and instructions for providing such a display. The location of a device may also be used in location-based services or computer applications, such as to narrow an Internet search to an area that is nearby the device location, to personalize "local" news and/or weather updates or information sent to the client device, to direct emergency calls (e.g., 911 call-services) to an appropriate or closest call handling service, to direct emergency services to help locate the client device in case of emergency, and the like.

Figure 7:
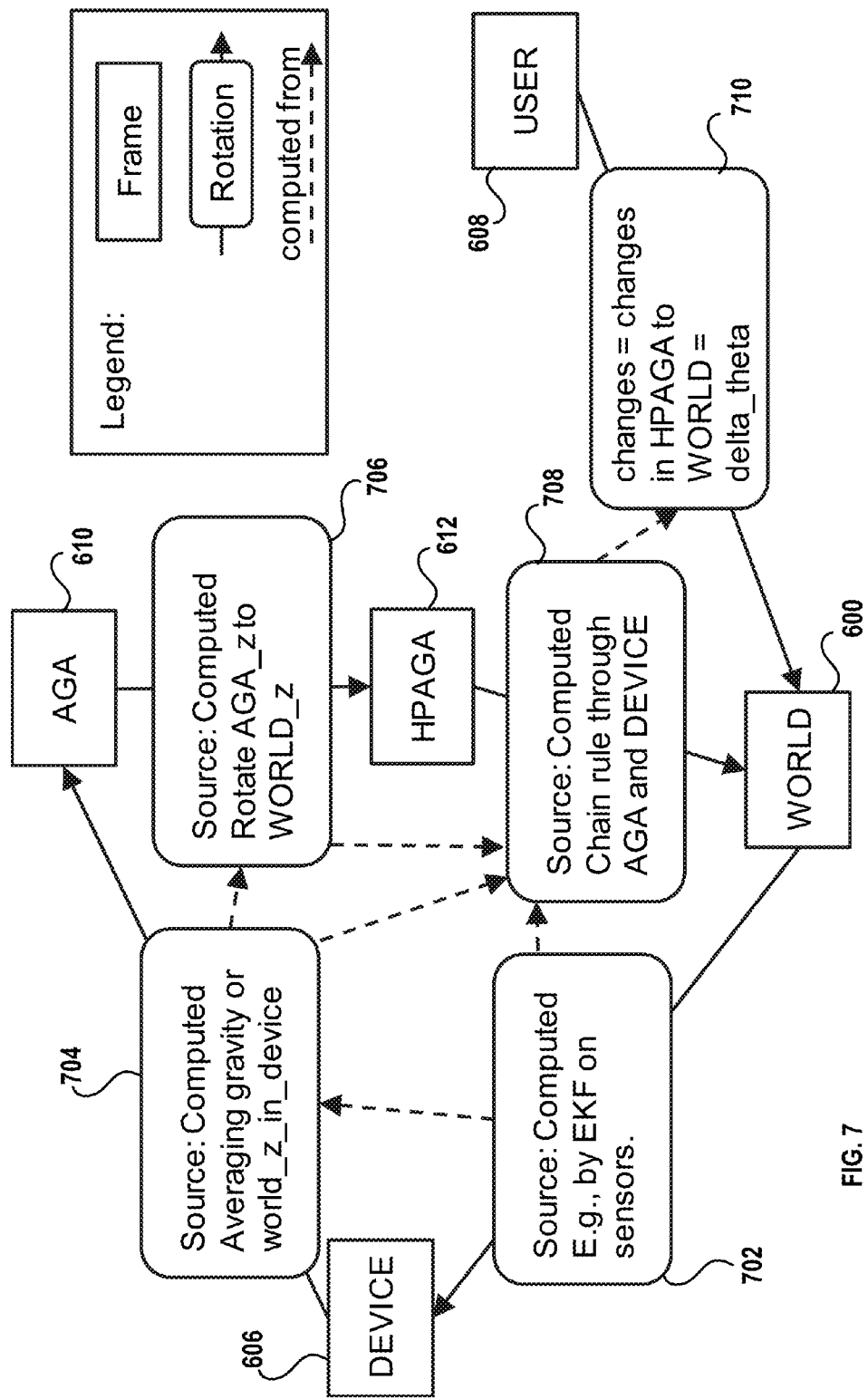
FIG. 7 is block flow diagram that illustrates relationships between frames and rotations, in accordance with an embodiment of the present disclosure.

FIG. 7 provides a block flow diagram that summarizes the frames, rotations, parameters, estimations, and/or computations described above in relation to FIG. 5. For instance, a block 702 represents the computation of the rotation $R_{device}^{world}$ from the device frame 606 to the world frame 600. A block 704 represents the computation of the rotation $R_{AGA}^{device}$ from the AGA frame 610 to the device frame 606. As shown in FIG. 7, the computation at block 704 may use the rotation $R_{device}^{world}$ device to compute the rotation $R_{AGA}^{device}$.

Further, FIG. 7 includes a block 706 that represents the computation of the rotation $R_{HPAGA}^{AGA}$ from the HPAGA frame 612 to the AGA frame 610. FIG. 7 shows that computation at block 706 may use the frame $R_{AGA}^{device}$ to compute the rotation $R_{HPAGA}^{AGA}$. FIG. 7 also includes a block 708 that represents the computation of the rotation $R_{world}^{HPAGA}$ from the world frame 600 to the HPAGA frame 612. As shown in FIG. 7, the computation at block 708 may use the frames $R_{device}^{world}$, $R_{AGA}^{device}$, and $R_{HPGA}^{AGA}$ to compute the rotation $R_{world}^{HPAGA}$ using the chain rule.

In addition, FIG. 7 includes a block 710 that represents the computation of changes in the orientation of a user (delta_theta), which also relates to a rotation $R_{world}^{user}$ from the world frame 600 to the user frame 608, and to a rotation $R_{world}^{HOAGA}$. As a general matter, it should be understood that a rotation $R_B^C$ from a frame B to a frame C is the inverse of a rotation $R_C^B$ from the frame C to the frame B.

Figure 8:
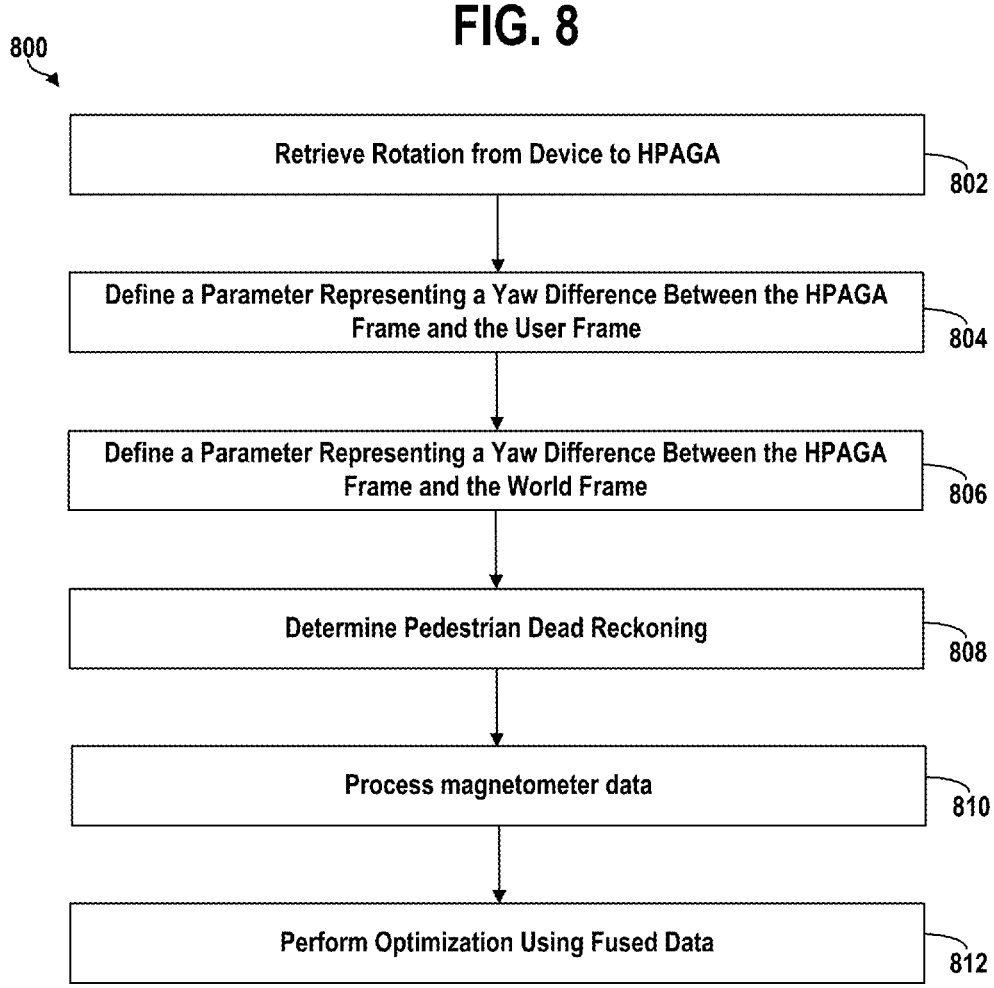
FIG. 8 is a flow chart of another example method for determining and using one or more orientations associated with a client device.

FIG. 8 is a block diagram of an example method 800 that may be used to perform the optimization 516 of FIG. 5. Generally, the method 800 may be implemented similarly as described above with respect to the method 500, including performing the various blocks in a different order and/or in parallel.

In method 800, at block 802, the computing device retrieves or otherwise accesses a rotation from HPAGA to the device, or $R_{HPAGA}^{device}$. The computing device may compute the rotation $R_{HPAGA}^{device}$ using the HPAGA frame and the device frame discussed above. In one example, the rotation $R_{HPAGA}^{device}$ is computed as the inverse of the rotation $R_{device}^{HPAGA}$, which may have been computed at block 516 of the method 500.

At block 804, the computing device defines a parameter user_heading_in_HPAGA that represents a yaw difference between the HPAGA frame and the user frame. Generally, $R_{user}^{HPAGA}$ is a rotation about the Z-axis by an angle of -user_heading_in_HPAGA (a rotation by the negative angle). The computing device may initially estimate the parameter user_heading_in_HPAGA, and later refine this parameter during optimization.

At block 806, the computing device defines a parameter HPAGA_yaw_in_world that represents a yaw difference between the HPAGA frame and the world frame. Generally, $R_{HPAGA}^{world}$ is a rotation about the Z-axis by an angle of -HPAGA_yaw_in_world (a rotation by the negative angle). The computing device may initially estimate the parameter HPAGA_yaw_in_world and may refine this parameter during the optimization. In practice, the parameter HPAGA_yaw_in_world varies as function of time, because the HPAGA frame moves relative to the world frame. In another implementation, the yaw of the rotation between two different frames can be estimated as a parameter. For example, the parameter can represent the rotation between the user and the world instead of the rotation between the HPAGA frame and the world frame. Because of the chain rule, this is mathematically equivalent.

At block 808, the computing device determines pedestrian dead reckoning data of the user of the client device. The computing device may determine or compute the pedestrian dead reckoning, which may be identified as $R_{user}^{world}$, according to the following Equation 8 and the different rotations discussed above:

$$R_{user}^{world} = R_{device}^{world} * R_{AGA}^{device} * R_{HPAGA}^{AGA} * R_{user}^{HPAGA} \quad (8)$$

Equation 8 is also equivalent to Equation 9:

$$R_{user}^{world} = R_{HPAGA}^{world} * R_{user}^{HPAGA} \quad (9)$$

The computing device may further optimize the computation of the pedestrian dead reckoning $R_{user}^{world}$ by using the delta_theta values discussed above as further constraints to the computation.

At block 810, the computing device processes measured magnetic field data to determine the magnetic field in the world frame. In the present example, the computing device processes the magnetic field data by rotating the data into the world frame according to a rotation $R_{device}^{world}$ computed by Equation 10:

$$R_{device}^{world} = R_{user}^{world} * R_{HPAGA}^{user} * R_{device}^{HPAGA} \quad (10)$$

Equation 10 is also equivalent to Equation 11:

$$R_{device}^{world} = R_{HPAGA}^{world} * R_{device}^{HPAGA} \quad (11)$$

In this example, the rotation $R_{device}^{world}$ is used to rotate the measured magnetic field in order to use the 3-D components of the magnetic field data. In addition, $R_{device}^{HPAGA}$ may be obtained from the chain rule of Equation 12:

$$R_{device}^{HPAGA} = R_{AGA}^{HPAGA} * R_{device}^{AGA} \quad (12)$$

Other variations to the equations discussed herein are also possible depending, in part, on how the parameters are being defined and on conversions using the chain rule.

At block 812, the computing device may perform an optimization using SLAM algorithms, such as GraphSLAM or FastSLAM, and/or in online localizations using other fusion algorithms, such as kalman filters. In one example, at block 812, the computing device uses the pedestrian dead reckoning data to fuse available GPS data, WIFI data, and/or Bluetooth scan data. The computing device may then use the resulting fused data as additional constraints in the optimization to identify different parameters, such as a location and map of the client device and other estimated rotations of the device.

Figure 9:
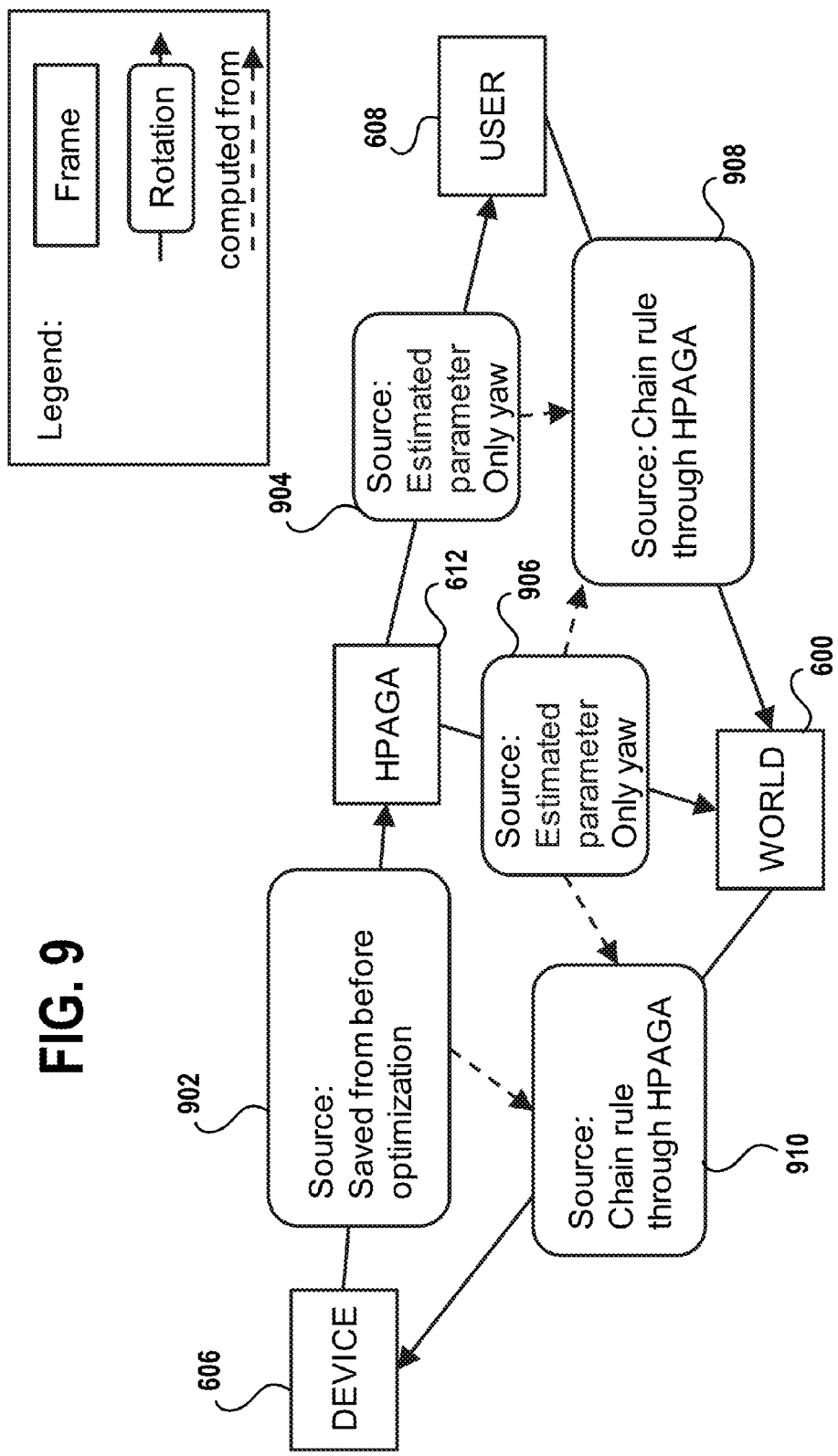
FIG. 9 is block flow diagram that illustrates relationships between frames, rotations, and/or parameters in accordance with an embodiment of the present disclosure.

FIG. 9 provides a block flow diagram that summarizes the frames, rotations, parameters, computations, and/or estimations described above in relation to FIG. 8. For instance, a block 902 represents the computation of the rotation $R_{device}^{HPAGA}$, which may have been computed before the optimization at blocks 516 or 812. A block 904 represents the estimation or definition of the parameter user_heading_in_HPAGA, which represents the difference in yaw between the HPAGA frame 612 and the user frame 608. In FIG. 9, a block 906 represents the estimation or definition of the parameter HPAGA_yaw_in_world, which represents the difference in yaw between the HPAGA frame 612 and the world frame 600.

Further, a block 908 represents the computation of a rotation $R_{user}^{world}$ from the user frame 608 to the world frame 600. The rotation $R_{user}^{world}$ may be obtained using a chain rule calculation through HPAGA rotations. For example, the rotation $R_{user}^{world}$ may be computed using Equations 8 or 9 above. As illustrated, the computation at block 908 may utilize delta-theta values that correspond to user_heading_in_HPAGA and/or HPAGA_yaw_in_world as constraints to help estimate the rotation $RR_{user}^{world}$. The rotation $RR_{user}^{world}$ may then be used as the user orientation with respect to the world to determine pedestrian dead reckoning data. In addition, this pedestrian dead reckoning data may be used to fuse other data or constraints, such as data from GPS, WIFI, and/or Bluetooth sensors.

In FIG. 9, a block 910 represents the computation of a rotation $R_{world}^{device}$ from the world frame 600 to the device frame 606. The rotation $R_{world}^{device}$ may be obtained using a chain rule calculation through HPAGA rotations. For example, the rotation $R_{world}^{device}$ may be computed using Equations 10 or 11 above. As illustrated, the computation at block 910 may utilize delta-theta values that correspond to HPAGA_yaw_in_world and a rotation $R_{device}^{HPAGA}$ constraints to help estimate the rotation. The rotation $R_{world}^{device}$ may then be used fuse magnetometer data associated with a client device.

Figure 10:
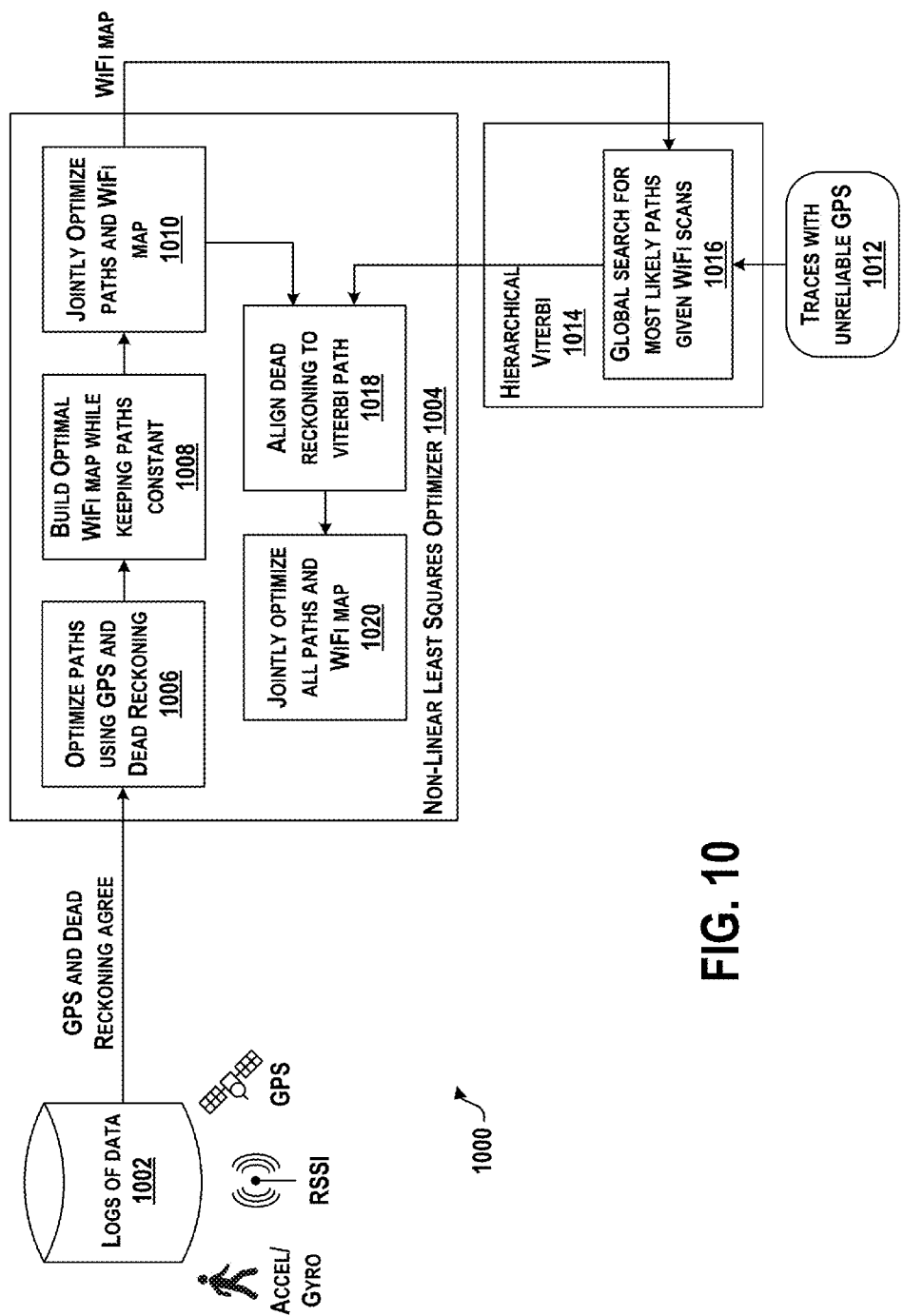
FIG. 10 is a block diagram that conceptually illustrates an example system for determining location estimates of a device, and optionally, maps of observed data received from the device.

FIG. 10 is a block diagram that conceptually illustrates an example system 1000 for determining locations. Any of the blocks in the system 1000 may be modules, processors, or other devices, or may take the form of instructions executable by processors to perform the associated function. The system 1000 may utilize the methods and processes described herein to perform one or more of the following calculations and optimizations.

In the system 1000, logs of data 1002 are received from devices. The logs of data may include GPS, RSSI, magnetometer, accelerometer, and gyroscope data with associated timestamps as collected by respective devices. The logs of data for which a dead reckoning and GPS location agree may be provided to a non-linear least squares optimizer 1004, for example. Logs of data for which a dead reckoning and GPS location do not agree may be rejected as erroneous data or data with too much noise. The non-linear least squares optimizer 1004 may optimize paths using GPS and dead reckoning, as shown at block 1006 and as described above using for example a ceres optimizer, and then build optimal WIFI maps while keeping the paths constant, as shown at block 1008. The non-linear least squares optimizer 1004 may further jointly optimize paths and WIFI maps using a SLAM optimization and output a WIFI map, as shown at block 1010.

Traces with unreliable GPS data (at block 1012) may be received at a hierarchical Viterbi processor 1014 to perform a global search for most likely paths given associated WIFI scans in the traces, as shown at block 1016. As an example, a path of a user trace may be determined using the Viterbi algorithm (e.g., most likely path through a graph) based on one or more of motion probabilities from dead reckoning, transition probabilities from floorplan, or emission probabilities from a WIFI model. The non-linear least squares optimizer 1004 may receive the output of the global search and align with the dead reckoning to a Viterbi path, as shown at block 1018, and jointly optimize all paths and WIFI maps using a SLAM optimization, as shown at block 1020.

The SLAM optimization is performed iteratively on growing subsets of states and constraints to determine a location of a user when data was collected based on all data collected. A first iteration uses subsets so that a function minimized is convex. Running SLAM on these subsets gives an estimate of the state subset. This estimate is used for determining the next subsets to include and the initialization to use for the next iteration. Thus, more constraints are added using a previous determination as a time starting point as the best prediction. The system 1000 defines a process that selects states, optimizes the states using a non-linear least squares solver, and runs SLAM algorithms to determine how to initialize the state for the next optimization iteration.

Although examples are described as determining a WIFI signal strength map, similar or same functions may be performed to determine localization of passively collected traces for creation of other types of maps, such as magnetometer maps.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining, by one or more processors of a computing device, a rotation between a client device coordinate frame defined with respect to a client device and a world coordinate frame defined with respect to a world;
   determining, by the one or more processors, a rotation between an average gravity aligned (AGA) coordinate frame defined with respect to an average gravity measurement of the client device and the client device coordinate frame;
   performing, by the one or more processors, step detection associated with the client device;
   determining, by the one or more processors, a change in orientation associated with the client device from a first detected step to a second detected step, wherein computing the change in orientation includes:
      determining a rotation between a horizontally projected AGA (HPAGA) coordinate frame that corresponds to the AGA coordinate frame when a vertically oriented Z-axis of the AGA coordinate frame is aligned with a vertically oriented Z-axis of the world coordinate frame and the AGA coordinate frame, wherein a horizontally oriented X-axis of the HPAGA coordinate frame represents an orientation associated with the device;

determining a rotation between the world coordinate frame and the HPAGA coordinate frame, wherein determining the rotation between the world coordinate frame and the HPAGA coordinate frame uses the rotation between the client device coordinate frame and the world coordinate frame, the rotation between the AGA coordinate frame and the client device coordinate frame, and the rotation between the HPAGA coordinate frame and the AGA coordinate frame; and determining the change in orientation associated with the client device from the first detected step to the second detected step by using the rotation between the world coordinate frame and the HPAGA coordinate frame;

determining, by the one or more processors and using the computed change in orientation, pedestrian dead reckoning data of the client device over a time period; and determining, by the one or more processors, an output location estimate of the client device using the pedestrian dead reckoning data.

2. The method of claim 1, further comprising:

determining, by the one or more processors, a rotation between a user coordinate frame defined with respect to a user of the client device and the HPAGA coordinate frame;

determining, by the one or more processors, a rotation between the user coordinate frame and the world coordinate frame, wherein determining the rotation between the user coordinate frame and world coordinate frame uses the rotation between the client device coordinate frame and the world coordinate frame, the rotation between the AGA coordinate frame and the client device coordinate frame, the rotation between the HPAGA coordinate frame and the AGA coordinate frame, and the rotation between the user coordinate frame and the HPAGA coordinate frame; and wherein determining the pedestrian dead reckoning data includes using the rotation between the user coordinate frame and the world coordinate frame.

3. The method of claim 1, wherein determining the change in orientation further includes:

determining first user yaw data corresponding to the first step and second user yaw data corresponding to the second step, wherein determining the first user yaw data and the second user yaw data includes using the rotation between the world coordinate frame and the HPAGA coordinate frame; and comparing the first user yaw data and the second user yaw data.

4. The method of claim 1, further comprising identifying time slices during which the rotation between the client device coordinate frame and the world coordinate frame varies less than a predetermined amount, and wherein one or more of determining the rotation between the AGA coordinate frame and the client device coordinate frame, performing step detection of the client device, or determining the change in orientation from the first detected step to the second detected step includes using data corresponding to the identified time slices and excluding data that does not correspond to the identified time slices.

5. The method of claim 1, further comprising:

performing, by the one or more processors, window averaging of determined changes in orientation; and determining the pedestrian dead reckoning data using the window averaged determined changes in orientation.

6. The method of claim 1, wherein determining the output location estimate includes performing a simultaneous localization and mapping (SLAM) optimization of the location of the client device based on the pedestrian dead reckoning data.

7. The method of claim 6, wherein determining the output location estimate includes performing the SLAM optimization of the location of the client device based on data generated by one or more sensors of the client device, wherein the one or more sensors include a global positioning system (GPS) receiver, a Wi-Fi sensor, a Bluetooth sensor, or a magnetometer.

8. The method of claim 7, wherein determining the output location estimate includes performing the SLAM optimization of the location of the client device based on magnetometer data generated by a magnetometer of the client device, further wherein determining the output location estimate includes processing the magnetometer data using a rotation from the client device coordinate frame to the world coordinate frame.

9. The method of claim 8, further comprising determining the rotation from the client device coordinate frame to the world coordinate frame by using a rotation from the HPAGA coordinate frame to the world coordinate frame and a rotation from the client device coordinate frame to the HPAGA coordinate frame.

10. A non-transitory computer-readable medium having stored therein instructions, that when executed by one or more processors of a computing device, cause the computing device to perform functions comprising:

determining, by one or more processors of a computing device, a rotation between a client device coordinate frame defined with respect to a client device and a world coordinate frame defined with respect to a world;

determining, by the one or more processors, a rotation between an average gravity aligned (AGA) coordinate frame defined with respect to an average gravity measurement of the client device and the client device coordinate frame;

performing, by the one or more processors, step detection associated with the client device;

determining, by the one or more processors, a change in orientation associated with the client device from a first detected step to a second detected step, wherein computing the change in orientation includes:

determining a rotation between a horizontally projected AGA (HPAGA) coordinate frame that corresponds to the AGA coordinate frame when a vertically oriented Z-axis of the AGA coordinate frame is aligned with a vertically oriented Z-axis of the world coordinate frame and the AGA coordinate frame, wherein a horizontally oriented X-axis of the HPAGA coordinate frame represents an orientation associated with the device;

determining a rotation between the world coordinate frame and the HPAGA coordinate frame, wherein determining the rotation between the world coordinate frame and the HPAGA coordinate frame uses the rotation between the client device coordinate frame and the world coordinate frame, the rotation between the AGA coordinate frame and the client device coordinate frame, and the rotation between the HPAGA coordinate frame and the AGA coordinate frame; and determining the change in orientation associated with the client device from the first detected step to the second detected step by using the rotation between the world coordinate frame and the HPAGA coordinate frame;

determining, by the one or more processors and using the computed change in orientation, pedestrian dead reckoning data of the client device over a time period; and determining, by the one or more processors, an output location estimate of the client device using the pedestrian dead reckoning data.

11. The non-transitory computer-readable medium of claim 10, wherein the functions further comprise:

determining, by the one or more processors, a rotation between a user coordinate frame defined with respect to a user of the client device and the HPAGA coordinate frame;

determining, by the one or more processors, a rotation between the user coordinate frame and the world coordinate frame, wherein determining the rotation between the user coordinate frame and world coordinate frame uses the rotation between the client device coordinate frame and the world coordinate frame, the rotation between the AGA coordinate frame and the client device coordinate frame, the rotation between the HPAGA coordinate frame and the AGA coordinate frame, and the rotation between the user coordinate frame and the HPAGA coordinate frame; and further wherein determining the pedestrian dead reckoning data includes using the rotation between the user coordinate frame and the world coordinate frame.

12. The non-transitory computer-readable medium of claim 10, wherein determining the change in orientation further includes:

determining first user yaw data corresponding to the first step and second user yaw data corresponding to the second step, wherein determining the first user yaw data and the second user yaw data includes using the rotation between the world coordinate frame and the HPAGA coordinate frame; and comparing the first user yaw data and the second user yaw data.

13. The non-transitory computer-readable medium of claim 10, wherein determining the output location estimate includes performing a simultaneous localization and mapping (SLAM) optimization of the location of the client device based on the pedestrian dead reckoning data.

14. The non-transitory computer-readable medium of claim 13, wherein determining the output location estimate includes performing the SLAM optimization of the location of the client device based on data generated by one or more sensors of the client device, wherein the one or more sensors include a global positioning system (GPS) receiver, a Wi-Fi sensor, a Bluetooth sensor, or a magnetometer.

15. The non-transitory computer-readable medium of claim 14, wherein determining the output location estimate includes performing the SLAM optimization of the location of the client device based on magnetometer data generated by a magnetometer of the client device, further wherein determining the output location estimate includes processing the magnetometer data using a rotation from the client device coordinate frame to the world coordinate frame.

16. The non-transitory computer-readable medium of claim 15, wherein the functions further comprise determining the rotation from the client device coordinate frame to the world coordinate frame by using a rotation from the HPAGA coordinate frame to the world coordinate frame and a rotation from the client device coordinate frame to the HPAGA coordinate frame.

17. A system comprising:

at least one processor; and a computer-readable medium, configured to store instructions, that when executed by the at least one processor, cause the system to perform functions comprising:

determining, by one or more processors of a computing device, a rotation between a client device coordinate frame defined with respect to a client device and a world coordinate frame defined with respect to a world;

determining, by the one or more processors, a rotation between an average gravity aligned (AGA) coordinate frame defined with respect to an average gravity measurement of the client device and the client device coordinate frame;

performing, by the one or more processors, step detection associated with the client device;

determining, by the one or more processors, a change in orientation associated with the client device from a first detected step to a second detected step, wherein computing the change in orientation includes:

determining a rotation between a horizontally projected AGA (HPAGA) coordinate frame that corresponds to the AGA coordinate frame when a vertically oriented Z-axis of the AGA coordinate frame is aligned with a vertically oriented Z-axis of the world coordinate frame and the AGA coordinate frame, wherein a horizontally oriented X-axis of the HPAGA coordinate frame represents an orientation associated with the device;

determining a rotation between the world coordinate frame and the HPAGA coordinate frame, wherein determining the rotation between the world coordinate frame and the HPAGA coordinate frame uses the rotation between the client device coordinate frame and the world coordinate frame, the rotation between the AGA coordinate frame and the client device coordinate frame, and the rotation between the HPAGA coordinate frame and the AGA coordinate frame; and determining the change in orientation associated with the client device from the first detected step to the second detected step by using the rotation between the world coordinate frame and the HPAGA coordinate frame;

determining, by the one or more processors and using the computed change in orientation, pedestrian dead reckoning data of the client device over a time period; and determining, by the one or more processors, an output location estimate of the client device using the pedestrian dead reckoning data.

18. The system of claim 17, wherein the functions further comprise:

determining, by the one or more processors, a rotation between a user coordinate frame defined with respect to a user of the client device and the HPAGA coordinate frame;

determining, by the one or more processors, a rotation between the user coordinate frame and the world coordinate frame, wherein determining the rotation between the user coordinate frame and world coordinate frame uses the rotation between the client device coordinate frame and the world coordinate frame, the rotation between the AGA coordinate frame and the client device coordinate frame, the rotation between the HPAGA coordinate frame and the AGA coordinate frame, and the rotation between the user coordinate frame and the HPAGA coordinate frame; and further wherein determining the pedestrian dead reckoning data includes using the rotation between the user coordinate frame and the world coordinate frame.

19. The system of claim 17, wherein determining the change in orientation further includes:

determining first user yaw data corresponding to the first step and second user yaw data corresponding to the second step, wherein determining the first user yaw data and the second user yaw data includes using the rotation between the world coordinate frame and the HPAGA coordinate frame; and comparing the first user yaw data and the second user yaw data.

20. The system of claim 17, wherein determining the output location estimate includes performing a simultaneous localization and mapping (SLAM) optimization of the location of the client device based on the pedestrian dead reckoning data.

* * * * *